Nov. 8, 1955
C. T. LEE
2,722,953
PORTABLE BAND TYPE POWER SAW
Filed March 23, 1953
3 Sheets-Sheet 1
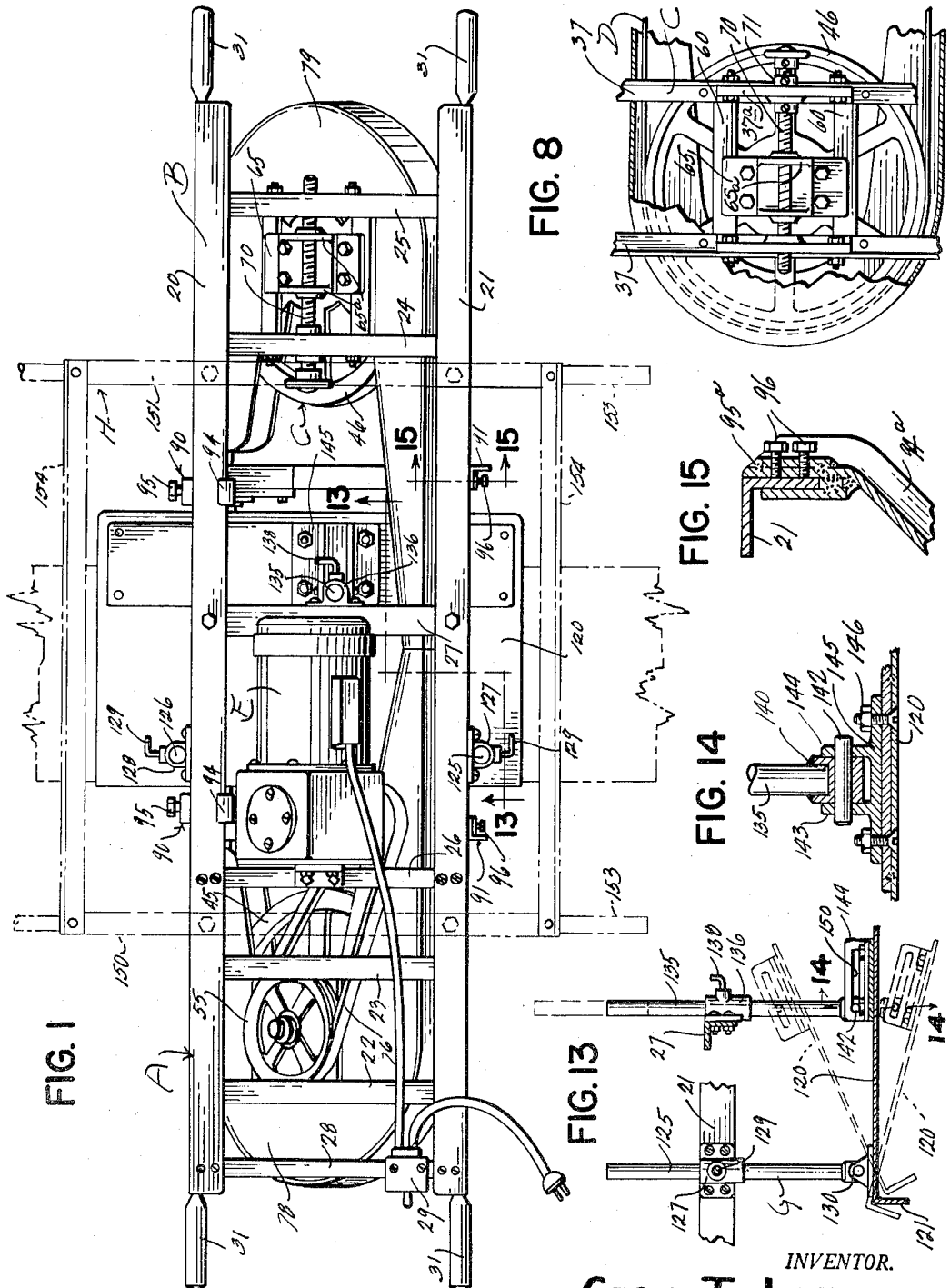
INVENTOR.
CECIL T. LEE
BY
Lancaster, Allwine & Rommel
Attorneys

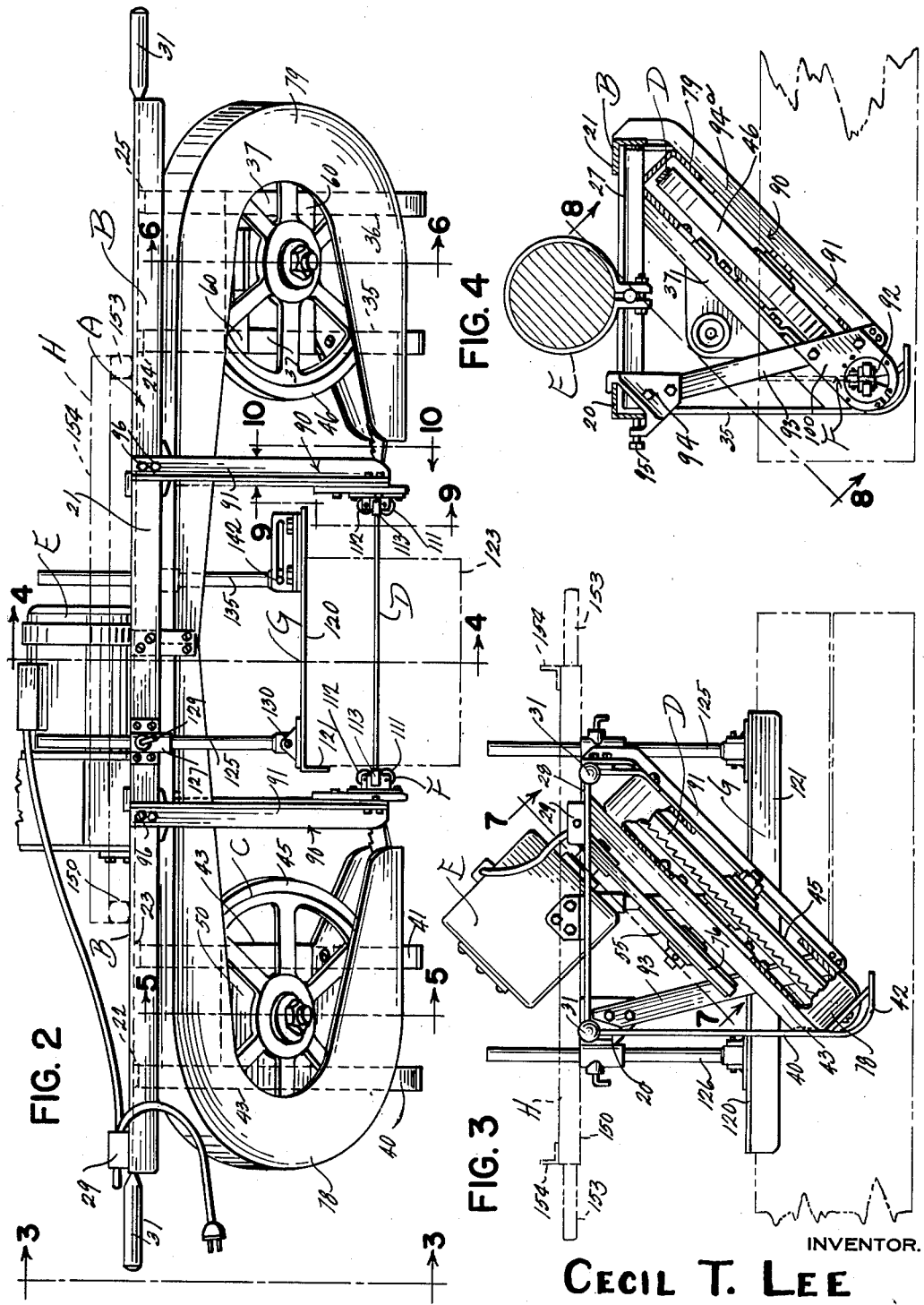

Nov. 8, 1955  C. T. LEE  2,722,953
PORTABLE BAND TYPE POWER SAW
Filed March 23, 1953  3 Sheets-Sheet 3
FIG. 5
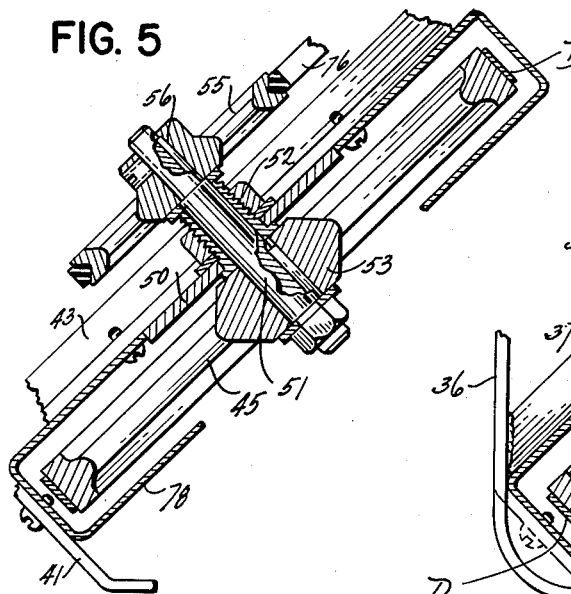
FIG. 6
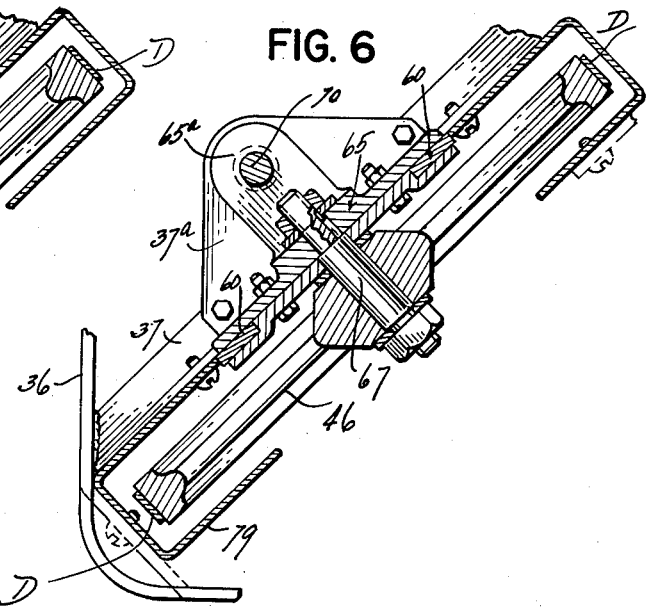
FIG. 9
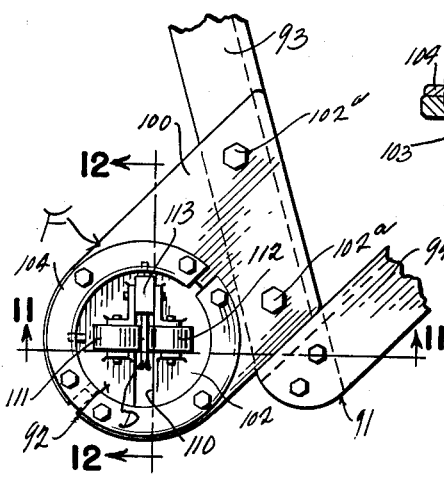
FIG. 11
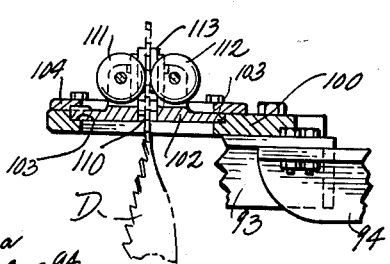
FIG. 10
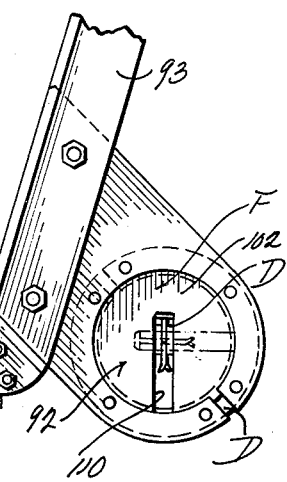
FIG. 12
FIG. 7
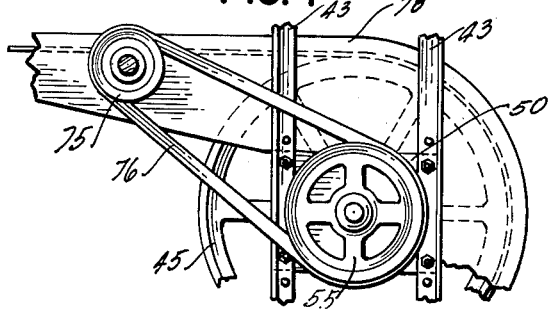
INVENTOR.
CECIL T. LEE
BY
Lancaster, Allwine Romme
Attorneys

United States Patent Office 2,722,953
Patented Nov. 8, 1955

2,722,953

PORTABLE BAND TYPE POWER SAW

Cecil T. Lee, Seattle, Wash.

Application March 23, 1953, Serial No. 344,095

8 Claims. (Cl. 143—19)

This invention relates to improvements in sawing appliances.

The primary object of this invention is the provision of an improved portable power saw of the flexible band blade type for rip and cross cut sawing of lumber, having various adjustments to enable desired depth, level and thickness cuttings.

A further object of this invention is the provision of an improved power operated band type portable saw, adaptable for use also as a stationary saw, and which may be handled with ease by an operator or operators for almost any kind of lumber cutting.

A further object of this invention is the provision of improved means for adjustably holding the work engaging blade portion of a flexible band saw in position to perform desired planes of cutting through lumber.

A further object of this invention is the provision of an improved appliance adaptable for use with portable saws whereby to perform accurate ripping of lumber of desired thicknesses, without undue strain upon the operator.

Other objects and advantages of this invention will be apparent during the course of the following detailed description.

In the accompanying drawings, forming a part of this specification, and wherein similar reference characters designate corresponding parts throughout the several views:

Fig. 1 is a top plan view of the improved saw, showing the associated features thereof, and in dot and dash line showing a piece of lumber being ripped; other dot and dash lines showing an auxiliary frame attachment which may be used as part of the saw if desired.

Fig. 2 is a side view of the arrangement of details shown in Fig. 1.

Fig. 3 is an end view of the sawing construction shown in Figs. 1 and 2 taken from the position designated by line 3—3 at Fig. 2 of the drawings.

Fig. 4 is a transverse cross sectional view taken through the saw construction (with the ripping attachment removed); the saw details being shown for cross cutting. The view is taken through the saw construction substantially at the position of the line 4—4 of Fig. 2.

Figs. 5 and 6 are transverse cross sectional views, taken substantially on their respective lines shown in Fig. 2, transverse to the saw frame and through the axes of the blade supporting wheels.

Fig. 7 shows details of the motor connection to one of the saw supporting and operating wheels, the view being taken substantially at the position of line 7—7 shown in Fig. 3.

Fig. 8, Sheet 1 of the drawings, is a view showing the adjusting means at one of the supporting wheels to hold the band saw blade taut, the view being taken substantially at the position of the line 8—8 in Fig. 4.

Figs. 9 and 10, Sheet 3 of the drawings, are views taken from the positions of lines 9—9 and 10—10 shown in Fig. 2 of the drawings; more particularly showing the adjustable guiding and work supporting means for the working portion of the saw blade.

Figs. 11 and 12 are transverse cross sectional views taken substantially on their respective lines shown in Fig. 9.

Fig. 13, Sheet 1 of the drawings, is a fragmentary cross sectional view taken substantially at the position shown by the line 13—13 in Fig. 1; more particularly illustrating the guide and saw support used for lumber ripping, and also showing how the guide angle may be changed for making bevel or diagonal type rip cuts through lumber.

Fig. 14 is a cross sectional view taken substantially on the line 14—14 of Fig. 13.

Fig. 15 is a cross sectional view taken substantially on the line 15—15 of Fig. 1.

In the drawings, wherein for the purpose of illustration is shown a preferred embodiment of the invention, the letter A may generally designate the improved power actuated saw construction. It includes a frame B having means C thereon for supporting the blade D. A motor E is provided upon the frame for rotating the blade D and its supporting wheels. An improved band saw guide means F is provided to position the work portion of the blade for desired lumber cuts, and a removable attachment G is provided to facilitate accurate and easy ripping of lumber.

The frame B is preferably constructed of metal, and because the saw is mainly intended to be used as a hand supporting appliance, the material is preferably magnesium alloy, for holding the weight to a minimum. Principally the frame comprises the main supporting rail or angle beam portions 20 and 21. They are connected in parallel relation by means of cross beams designed to serve various functions in the support of other parts. Two of these cross beams 22 and 23 reinforce the frame structure adjacent one of the saw band supporting wheels, and two others, 24 and 25, are located upon the frame to reinforce the other band supporting wheel structure, at the opposite end of the frame B. Two rail connecting beams 26 and 27 are provided about midway between the ends of the frame structure, for supporting the motor E, and another cross beam 28 is disposed at one end of the frame structure B for supporting a motor switch 29. All of the beams 22 to 28 inclusive reinforce and support the positions of the rails 20 and 21, and they may be welded, riveted, bolted or otherwise secured to said rails.

At each end the frame structure B is preferably provided with a pair of handles 31, by means of which two individuals may, with ease, manipulate the frame structure for the performance of various lumber and timber sawing operations.

The blade D is preferably of high grade band saw steel. It is supported upon the frame so that it can be readily removed from its supporting wheels. Teeth are arranged along one edge of the band and the opposite parallel edge is smooth for cooperative association with rollers of the blade guide means F.

The general plane of the band, when in operating position upon the frame B, is at an acute angle with respect to the plane in which the frame rails 20 and 21 lie. To that end the wheels of the band saw supporting means C are disposed on axes which are located at an acute angle to the plane of the frame B.

For the adjustable idler wheel of the saw band supporting means C a pair of supporting standards 35 and 36 are provided (see Fig. 2), connected at their upper ends in any approved manner to the frame rail 20; the said legs 35 and 36 being connected, close to their lower ends, with diagonal angle braces 37 (see Fig. 6). The upper ends of said diagonal braces 37 are connected to the horizontal cross pieces 24 and 25 and they may be extended to the opposite rail 21 and connected therewith. Similarly, for the motor driven wheel structure of the means C, located at the opposite end of the frame B, supporting standards 40 and 41 are provided; their upper ends being welded or otherwise connected to the rail 20, and close to their lower ends they are reinforced by means of diagonal angle struts 43 (see Fig. 3); the upper ends of said struts 43 being secured either to the cross beams 22 and 23 or to the rail 21. The lower ends of the standards 35, 36, 40 and 41 may be curved inwardly under the frame, as shown at 42 in Fig. 3, as a guard and support for the appliance.

The saw blade supporting means C includes a motor driven wheel 45 and an idler wheel 46; these two wheels being supported respectively by the diagonal angle beams 43 and 37, as shown in Figs. 5 and 6.

The two angle beams 43 are transversely connected together by means of a diagonally disposed plate 50, shown in Fig. 5, which may be welded or otherwise secured thereto. This plate 50 rotatably supports the wheel shaft 51, as by means of a detachable bushing or bearing 52, bolted to the plate 50. The hub 53 of the wheel 45 is keyed to the spindle 51, and the latter at its end beyond the supporting angles 43 is provided with a pulley 55 keyed at 56 thereto. The planes of the wheel 45 and pulley 55 are parallel.

The wheel 46 is rotatably supported in the same plane as the band supporting wheel 45. It is bodily adjustable towards and away from the wheel 45, for the purpose of giving a belt tightening effect to saw blades.

The diagonal wheel supporting angle struts 37 have attached therewith a pair of cross beams 60; the latter being in spaced but parallel relation, and their ends may either be bolted or welded to the struts 37. They act as tracks for supporting a slidable plate construction 65, shown best in Fig. 6. It has slide grooves therein for receiving the tracks 60. To produce this effect the slide plate 65 may be of two part construction as shown in Fig. 6. The spindle or shaft 67 of the wheel 46 is detachably secured to the slide plate 65, as shown in Fig. 6, and said shaft rotatably receives thereon the idler wheel 46.

As is shown in Fig. 8, the plate 65 is adjusted along the tracks 60 by means of a threaded shank 70 which has a bearing at 71 upon an extension 37ª attached to the beam 37 (see Fig. 6); the shank being threaded in one of the extensions 65ª (see Fig. 6) of the slide plate.

The saw blade D is trained over the outer smooth peripheries of the wheels 45 and 46, and lies in the same plane as said wheels.

The motor E is supported upon beams 26 and 27, as shown in Fig. 1. It is preferably an electric motor and its switch 29 is mounted upon the beam 28. The motor E is provided with a driving wheel 75, shown in Fig. 7. A belt 76 is trained around the pulley 55 and over the wheel 75, as shown in Figs. 5 and 7. The motor may be of any approved type, with means thereon for varying the speed thereof if desired.

Guard casings or housings 78 and 79 may be provided for the wheels 45 and 46. They are of U-shaped transverse cross section, and extending around the major peripheries of the wheels 45 and 46, and safely enclosing the upper tread of the saw blade adjacent to the rail 21. These housings may be in two sections, and are preferably secured to the diagonal braces 37 and 43 of the frame, as well as to the lower ends of the standards 35, 36, 40 and 41, as shown in the various views of the drawings. Only the portion of the saw blade D centrally between the ends of the frame B is exposed and not covered by the guard housings.

Improved guide means F is provided for holding the working portion of the saw blade at the desired cutting angle with respect to the frame. This comprises a pair of identical guide sections 90 (see Fig. 2), each of which is preferably detachably connected to the beams 20 and 21 of the frame B, in the location between the two blade supporting wheels, as is shown in various views of the drawings. These guide supporting sections 90 each include a frame structure 91 and a blade holding and adjusting means 92. The frame structures 91 each include an upright supporting standard or member 93 (see Fig. 4), having a bracket 94 at its upper end for detachable connection to the rail 20. This connection includes a bolt 95 for rigid clamping to the rail 20. The standard 93 hangs at a slight angle off vertical and downwardly. A second frame member 94ª is fixedly secured at its lower end to the lower end of the standard 93 and at its upper end it is provided with an angle receiving bracket 95ª, shown best in Fig. 15, by means of which to receive in socketed relation therein one of the legs of the angle 21, as shown in Fig. 15. It is bolted to the angle at 96. The frame members 93 and 94 thus provide a V-shaped frame construction, to the apex of which the blade guide means 92 is secured.

Each guide means 92 preferably comprises a bracket arm 100 detachably bolted at 102ª to the apex of the V-shaped frame 91. The arm 100 rotatably supports a roller supporting disc 102, within an annular groove 103, as shown in Fig. 11; a detachable plate 104 cooperating with the plate 100 to provide the groove. The disc 102, as will be noted from Figs. 9, 10, 11 and 12, is provided with a radial slot 110 therein, adapted to receive the saw blade D for free movement of the latter during rotation. The disc 102 rotatably supports three rollers 111, 112 and 113. They are supported upon pins bearing in flanges extending transversely from the disc 102 so that the peripheral portions of the rollers overhang the slot 110, extended, as shown in Fig. 9. The rollers 111 and 112 lie in the same plane and engage the opposite sides of the saw blade D. The roller 113 engages the smooth edge of the blade, as shown in Fig. 12. The disc 102 may be rotated to locate the slot 110 at any position around 360°. The clamping ring 104 may be split to facilitate assembly of the guide to the saw blade. The bolts 104ª which secure the ring 104 to the disc supporting plate 100 when drawn tightly, fixedly clamp the disc 102 in the desired position against rotation.

As shown in Figs. 4 and 9, the working portion of the blade D between the two guide sections 90 is positioned for cross cutting of lumber (see Fig. 4). In this position the slot 110 is vertically disposed. If it is desired to rip the lumber the disc 102 is adjusted to horizontally position the slot 110. The guides then hold the working portion of the blade D for ripping, as shown in Fig. 2.

The rip saw attachment G is provided for longitudinal ripping of timber or lumber. It includes a gauge and guide member 120 adapted for location between the plane of the frame rails 20 and 21 and the working portion of the saw blade, as shown in Fig. 2. It is in the form of a plate and preferably has a downwardly extending guide angle 121 along one edge thereof. The plate 120 is adapted to be slidably supported in engagement with the piece of timber or lumber 123 to be sawed. It can be supported at varying distances between the working portion of the blade and the frame to fix the exact depth of rip cut. Furthermore, the angle of the plate 120 may be changed, as shown in dotted lines in Fig. 13 in order to bevel or diagonally rip cut lumber.

The gauge plate 120 is preferably provided with three supports upon the frame B. These include a pair of supporting rods or standards 125 and 126, slidably secured in brackets 127 and 128 respectively upon the outer sides of the frame rails 21 and 20. A clamping means 129 is secured to each of the bearings 127 and 128 for the clamping of the rods 125 and 126 at the desired location for supporting the engaged plate 120 at the desired level. The rods 125 and 126 at their lower ends may be pivotally connected at 130 upon suitable supporting brackets or ears secured to the plate 120. The supporting rods 125 and 126 are secured to the gauge plate 120 along its edge adjacent to the guide flange 121. A third supporting standard 135 is slidably extended through a bracket 136 secured to the frame cross brace 127, as shown in Figs. 1 and 13 of the drawings, and it can be clamped in fixed position by a crank type bolt 138. The lower end of the standard 135 is provided with a cap portion 140, shown in Fig. 14, having a transverse pin 142 therethrough pivotally and slidably bearing in the rail portions 143 and 144 of a bracket 145. The latter is detachably connected at 146 upon the gauge plate 120, and the rails 143 and 144 are provided with slots 150 therealong within which the ends of the pin 143 slidably and pivotally bear. It will be noted from the dotted positions shown in Fig. 13 that the gauge plate 120 may be disposed at various angles for the production of diagonal or bevel rip cuts.

From the foregoing it will be apparent that the portable power saw is intended to be manipulated by two individuals grasping the frame structure at the ends of the frame. The position of parts for cross cutting is shown in Fig. 4, and then the rip sawing attachment F is not used. For cross cutting, right angle cuts may be made in a piece of timber, as shown in Fig. 4, or diagonal cuts can be made in the work through the adjustment of the guide roller disc 102 in accordance with the description above made.

For rip cutting, with true precision work, the parts are adjusted as shown in Fig. 2. The operators may move the saw bodily along with the gauge plate in engagement with and resting upon the work 123 for efficient and quick ripping. If the rip cut is to be made at an angle, the gauge plate 120 is adjusted to the desired angle, as above described. It is also possible to utilize the appliance as a stationary power saw for rip and cross cuts by clamping it in some fixed position and moving the work against the saw blade.

I may provide an auxiliary frame designated in dot and dash lines at H in the drawings. This consists of side members 150 and 151 bolted at 152 to the beam rails 20 and 21, at right angles thereto. The ends of the members 150 and 151 are provided with handles 153, and cross angles 154 may connect the portions 150 and 151 in their desired spaced relation.

Since the frame structure and most of the supporting parts are made of light weight magnesium alloy, the saw may be readily manipulated. The arrangement is well balanced because the motor is centrally located upon the frame, and it may additionally be counterweighted to compensate for any eccentricity in weight of the parts of the sawing appliance. Thus, each operator lifts the same amount of weight. It will be noted that the working part of the saw blade is not obstructed on either side by any part of the appliance. The teeth of the blade may be of any type and they may face to either side of the frame.

The wheels which support the blade are supported on the frame only at one side. This facilitates removal or replacement of the blade. It is only necessary, to remove the blade, to slacken it through adjustment of screw 70, and to adjust the guide disc ring 104 and disc 102 for alignment of the slots therein with the slot of the arm 100. No other part of the appliance need be removed or adjusted.

In order to designate the relation of the details of the invention, the upper portion of the frame has been described as horizontal; the wheel supporting legs are vertical, and the axes of the wheels diagonal. It is of course understood that the position of the said horizontal portion of the frame and the vertical wheel supporting means do not always assume these positions during actual use of the device.

Various changes in the shape, size and arrangement of parts may be made to the form of invention herein shown and described, without departing from the spirit of the invention or scope of the claims.

I claim:

1. A portable power actuated band saw comprising a frame construction having a normally positioned horizontal portion, spaced wheels rotatably mounted on the frame construction, an endless band saw trained over said wheels with one run of the band comprising a cutting portion, a motor mounted on the casing operatively connected with at least one of said wheels for rotating said band, the wheels being mounted upon said frame on axes which are at an angle of less than 90° with respect to the plane of the horizontal portion of the frame, guide means mounted on the frame for positioning the cutting portion of the band in planes at different selected angles, and a work engaging gauge and slide plate adjustably mounted upon the frame between the cutting portion of the blade and the horizontal portion of the frame for resting upon the work and for sliding therealong during rip cutting of the work.

2. A portable power actuated saw construction as described in claim 1 in which said gauge and slide plate has a transverse guide flange thereon extending toward the cutting portion of the blade for engagement with the side of a piece of work during sliding of the saw along the work for rip cutting thereof.

3. A portable type power band saw comprising a frame having a normal horizontal portion provided with handle means thereon, a pair of wheels rotatably supported upon said frame on axes which are in a position below the normal horizontal portion and arranged at an angle of less than 90° with respect to the normal horizontal portion of the frame, an endless band saw mounted for rotation with said wheels and trained thereover and including a cutting portion positioned between the wheels remote from the normal horizontal portion of the frame, and a work engaging slide and gauge plate mounted on the frame in a position between the normal horizontal portion and the cutting portion of the saw blade for movement towards and away from said normal cutting portion of the blade.

4. A portable saw as described in claim 3 wherein the means supporting the gauge plate upon said frame can vary the position of said plate longitudinally of the cutting portion of the blade for diagonal rip cutting of a piece of work.

5. A portable power actuated saw comprising a frame structure having an elongated normally horizontal portion with handle means thereon, vertical frame portions at the ends of one side of said horizontal portion depending in substantially right angled relation thereto, a pair of wheels, means mounting said wheels on said horizontal and vertical frame portions for rotation on axes diagonal to the planes of the horizontal and vertical frame portions, an endless band saw rotatably supported upon said wheels, power means on the horizontal portion of the frame having an operating connection with at least one of the said wheels for rotating the wheels and the band saw therewith, said band saw having a cutting portion remote from the horizontal portion of the frame and remote from and between the said vertical portions of the frame, and means on said frame for guiding the cutting portion of the blade in vertical, horizontal or different angular cutting positions.

6. A power actuated band saw as described in claim 5 wherein a work engaging slide plate is mounted upon the frame at a location between the cutting portion of the blade and the horizontal portion of the frame for engaging work.

7. A portable power actuated saw comprising a frame structure having an elongated normally horizontal portion with handle means thereon, vertical frame portions at one side of said horizontal portion depending in substantially right angled relation thereto, a pair of wheels, means mounting said wheels on said horizontal and vertical frame portions for rotation on axes diagonal to the planes of the horizontal and vertical frame portions, an endless band saw rotatably supported upon said wheels, power means on the horizontal portion of the frame having an operating connection with at least one of the said wheels for rotating the wheels and the band saw therewith, said band saw having a cutting portion remote from the horizontal portion of the frame and remote from the said vertical portions of the frame, and means on said frame for guiding the cutting portion of the blade in vertical, horizontal or different angular cutting positions, a gauge plate, means mounting said plate upon the horizontal portion of the frame for supporting it in adjustable position between the cutting portion of the blade and the horizontal portion of the frame, and means on said frame and plate for adjustably holding the plane of said plate in parallel or diagonal positions with respect to the plane of the horizontal portion of said frame, and means on the frame for adjustably holding the plane of the cutting portion of the blade in different positions with respect to the plane of said plate.

8. In a portable sawing appliance, the combination of an elongated horizontal supporting frame having operator grasping handles at both ends thereof, an endless flexible band saw blade, means rotatably mounting the blade lengthwise upon the frame so that it includes a straight line work engaging cutting portion, means on said frame to hold and support the straight line cutting portion of the blade at any of various cutting angles with respect to the plane of said frame, a work engaging gauge plate located between the horizontal frame and the straight line cutting portion of the blade for adjustable movement toward and away from the blade cutting portion, said work engaging plate having a right angle flange along a side thereof adapted to engage the side of a piece of work.

References Cited in the file of this patent
UNITED STATES PATENTS

| | | |
|---|---|---|
| 1,072,200 | Wright | Sept. 2, 1913 |
| 1,427,661 | Walker | Aug. 29, 1922 |
| 1,449,805 | Arnold et al. | Mar. 27, 1923 |
| 1,499,124 | Reichmann | June 24, 1924 |
| 2,033,846 | Mitchell | Mar. 10, 1936 |
| 2,515,345 | Hayes | July 18, 1950 |
| 2,556,670 | Ashworth | June 12, 1951 |
| 2,596,081 | Sacrey | May 6, 1952 |

FOREIGN PATENTS

| | | |
|---|---|---|
| 608,767 | Great Britain | Sept. 21, 1948 |
| 724,275 | Germany | Aug. 21, 1942 |